(12) United States Patent
Pang et al.

(10) Patent No.: US 11,287,901 B2
(45) Date of Patent: Mar. 29, 2022

(54) OPTICAL DETECTING DEVICE WITH LIFT HEIGHT DETECTION FUNCTION

(71) Applicant: PixArt Imaging Inc., Hsin-Chu (TW)

(72) Inventors: Kwai Lee Pang, Penang (MY); Wooi Kip Lim, Penang (MY); Siew Chin Lee, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/681,836

(22) Filed: Nov. 13, 2019

(65) Prior Publication Data

US 2021/0141465 A1    May 13, 2021

(51) Int. Cl.
*G06F 3/03* (2006.01)

(52) U.S. Cl.
CPC .................... *G06F 3/0304* (2013.01)

(58) Field of Classification Search
CPC ................................................. G06F 3/0304
See application file for complete search history.

(56) References Cited

U.S. PATENT DOCUMENTS

| 7,189,985 | B2 * | 3/2007 | Xie | G06F 3/0317 250/559.24 |
| 2007/0008286 | A1 * | 1/2007 | Theytaz | G06F 3/0317 345/166 |
| 2007/0109267 | A1 * | 5/2007 | Guo | G06F 3/0317 345/166 |
| 2007/0290991 | A1 * | 12/2007 | Bieber | G06F 3/0383 345/157 |
| 2007/0291001 | A1 * | 12/2007 | Trisnadi | G06F 3/0317 345/166 |
| 2008/0158158 | A1 * | 7/2008 | Cheah | G06F 3/0317 345/166 |
| 2011/0057906 | A1 * | 3/2011 | Raynor | G06F 3/0317 345/175 |
| 2014/0267187 | A1 * | 9/2014 | Cooke | G06F 3/03547 345/179 |

\* cited by examiner

*Primary Examiner* — William Boddie
*Assistant Examiner* — Andrew B Schnirel
(74) *Attorney, Agent, or Firm* — Winston Hsu (57) ABSTRACT

An optical detecting device capable of detecting a lift height of an optical navigation apparatus is disclosed. The optical detecting device includes a sensor module and a processor. The sensor module includes a sensor array and at least one detector strip. The sensor array is adapted to acquire navigation information of the optical navigation apparatus moved relative to a working surface by sensing an illumination area, and the detector strip has a detection region across an edge of the illumination area. The processor is electrically connected to the sensor module, and adapted to compute the lift height of the optical navigation apparatus relative to the working surface according to a detection result of the detector strip.

13 Claims, 7 Drawing Sheets

OPTICAL DETECTING DEVICE WITH LIFT HEIGHT DETECTION FUNCTION

BACKGROUND OF THE INVENTION

1. Field of the Invention

The present invention relates to an optical detecting device, and more particularly, to an optical detecting device capable of detecting a lift height of an optical navigation apparatus.

2. Description of the Prior Art

A conventional optical mouse utilizes a single entity of pixel array to detect an illumination area projected onto a working surface. An image captured by the said pixel array is analyzed to acquire navigation information and lifting information. When the optical mouse is shifted above the working surface, a movement of any spot within the image is transformed into the navigation information; when the optical mouse is lifted relative to the working surface, an edge of the illumination area is moved and an imaging quality of the illumination area is decreased, so that variation of the edge and the imaging quality is transformed into the lifting information. However, conventional lift detection algorithm cannot precisely identify the edge variation if a lifting height of the optical mouse is less than one millimeter. Thus, design of an optical detecting device capable of detecting a small lifting height of the optical mouse is an important issue in the related industry.

SUMMARY OF THE INVENTION

The present invention provides an optical detecting device capable of detecting a lift height of an optical navigation apparatus for solving above drawbacks.

According to the claimed invention, an optical detecting device capable of detecting a lift height of an optical navigation apparatus is disclosed. The optical detecting device includes a sensor module and a processor. The sensor module includes a sensor array and at least one detector strip. The sensor array is adapted to acquire navigation information of the optical navigation apparatus moved relative to a working surface by sensing an illumination area, and the detector strip has a detection region across an edge of the illumination area. The processor is electrically connected to the sensor module, and adapted to compute the lift height of the optical navigation apparatus relative to the working surface according to a detection result of the detector strip. The optical detecting device further includes a light source adapted to project the illumination area onto the working surface, and the detector strip includes a plurality of detectors arranged as a strip intersecting the edge of the illumination area.

According to the claimed invention, one part of the plurality of detectors faces the illumination area and the other part of the plurality of detectors faces the working surface without the illumination area when a center of the sensor array aligns with a center of the illumination area. A length of the detector strip is greater than a length of the sensor array or a dimension of the illumination area. An amount of the plurality of detectors having the detection region across the illumination area is decreased when the optical navigation apparatus is lifted.

According to the claimed invention, the processor analyzes parameter variation of the detection result for determining the lift height. A parameter of the detection result is an intensity, a voltage or a current generated by the detector strip. The processor includes at least one comparison circuit used to compare the detection result with a reference signal for determining the lift height. An amount of the comparison circuit corresponds to an amount of detectors within the detector strip.

According to the claimed invention, the detector strip is spaced from the sensor array, or is combined with the sensor array. The detector strip is connected to a side of the sensor array, or surrounded by the sensor array. The detector strip is a straight form or a curved form. The sensor module includes a plurality of detector strips respectively disposed on different sides of the sensor array.

The detectors of the present invention preferably can be, but not limited to, a photodiode due to low noise. The signals generated by the detectors within the detector strip can be integrated, and the said signals can be the detection result as the intensity, the voltage or the current from the detector strip, so the optical detecting device can analyze the detection result for determining the lift height of the optical navigation apparatus. Further, energy of each detector may be individually analyzed to decide which detector detects illumination variation for determining position of the edge of the illumination area, and the lift height of the optical navigation apparatus can be computed accordingly. The optical detecting device can reduce a pitch between adjacent detectors of the detector strip for preferred precision. The detector strip longer than the illumination area projected by the light source can include the plurality of detectors with the small pitches; even if the optical navigation apparatus is slightly lifted, the detectors align with the edge of the illumination area still can accurately detect shifting of the edge, that is to say, the optical detecting device of the present invention can utilize the detector strip to immediately and precisely determine the small lift height of the optical navigation apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
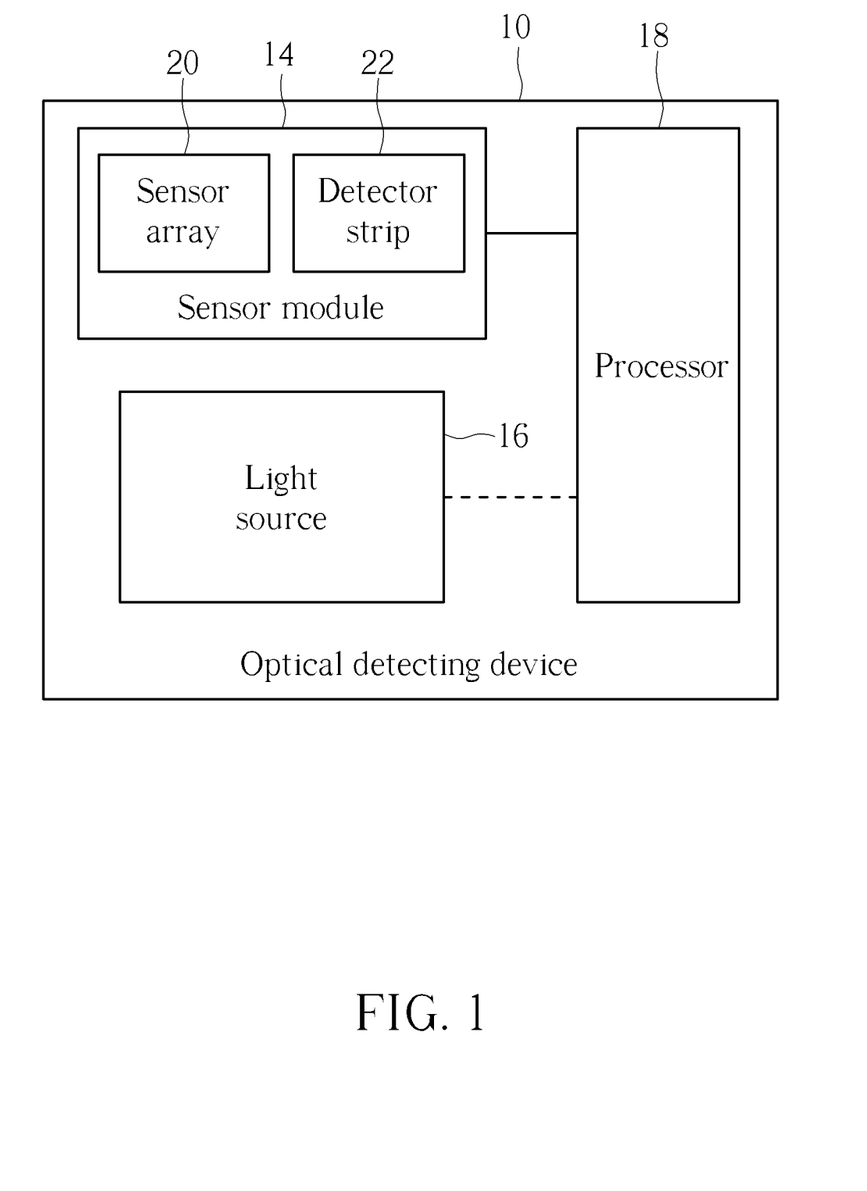
FIG. 1 is a functional block diagram of an optical detecting device according to an embodiment of the present invention.
Figure 2:
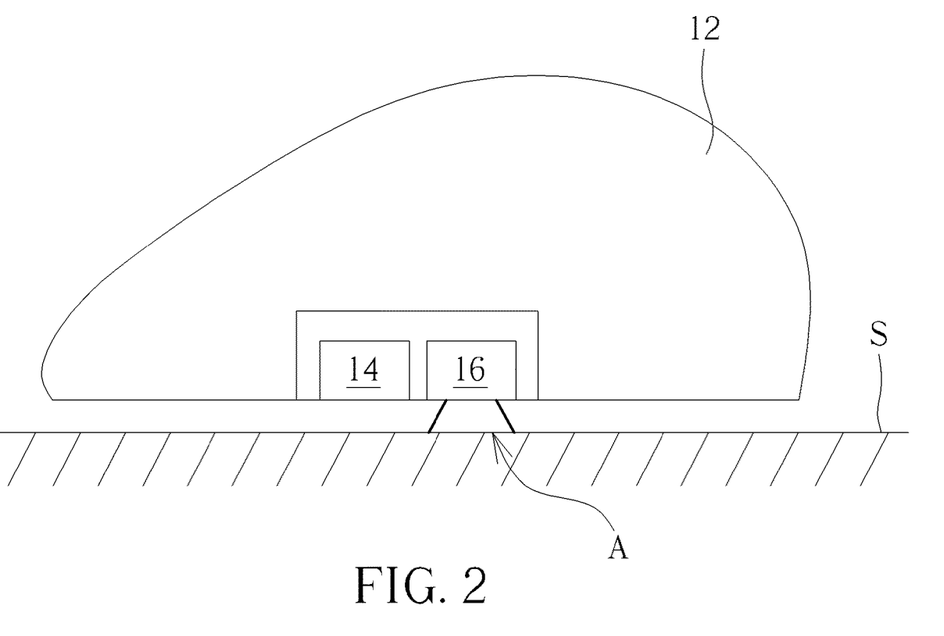
FIG. 2 and FIG. 3 are diagrams of an optical navigation apparatus lifted at different heights according to the embodiment of the present invention.
Figure 3:
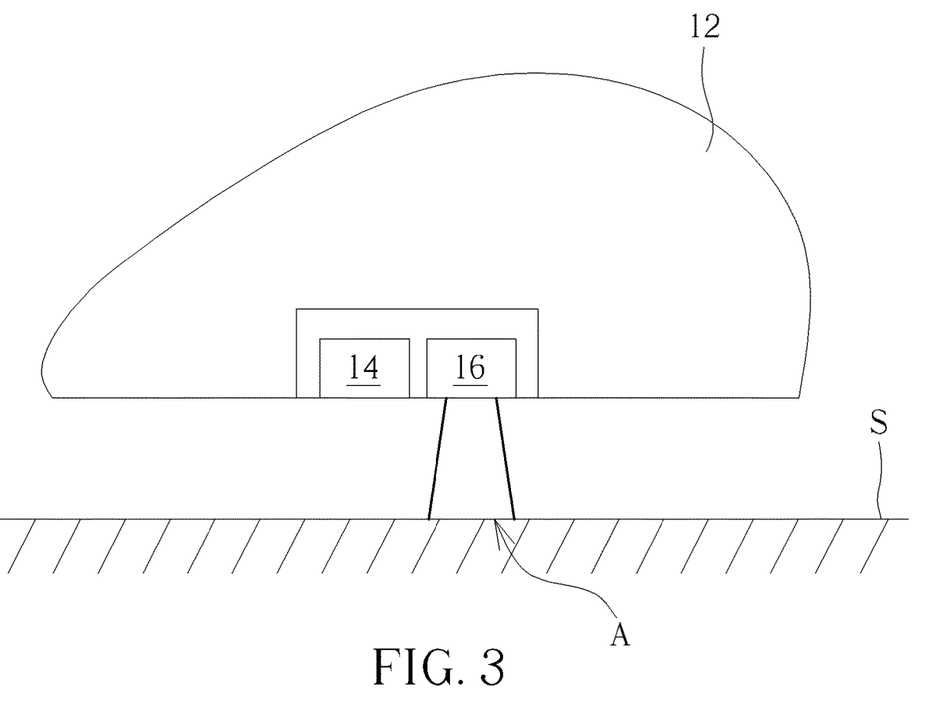

Please refer to FIG. 1 to FIG. 3. FIG. 1 is a functional block diagram of an optical detecting device 10 according to an embodiment of the present invention. FIG. 2 and FIG. 3 are diagrams of an optical navigation apparatus 12 lifted at different heights according to the embodiment of the present invention. The optical navigation apparatus 12 can have the optical detecting device 10 and be shifted and/or lifted on a working surface S. The optical detecting device 10 can detect a horizontal movement and a vertical movement of the optical navigation apparatus 12 relative to the working surface S. The optical detecting device 10 can include a sensor module 14, a light source 16 and a processor 18. The processor 18 can be electrically connected to the sensor module 14, and may be electrically connected to the light source 16 optionally.

The light source 16 can project an illumination area A onto the working surface S. The sensor module 14 can include a sensor array 20 and at least one detector strip 22. The sensor module 14 can sense the illumination area A via the sensor array 20 and the detector strip 22 to acquire navigation and lifting information of the optical navigation apparatus 12. The processor 18 can receive a sensing result of the sensor array 20 to compute the horizontal movement, and further can receive a detection result of the detector strip 22 to compute the vertical movement for acquiring a lift height of the optical navigation apparatus 12.

Figure 4:
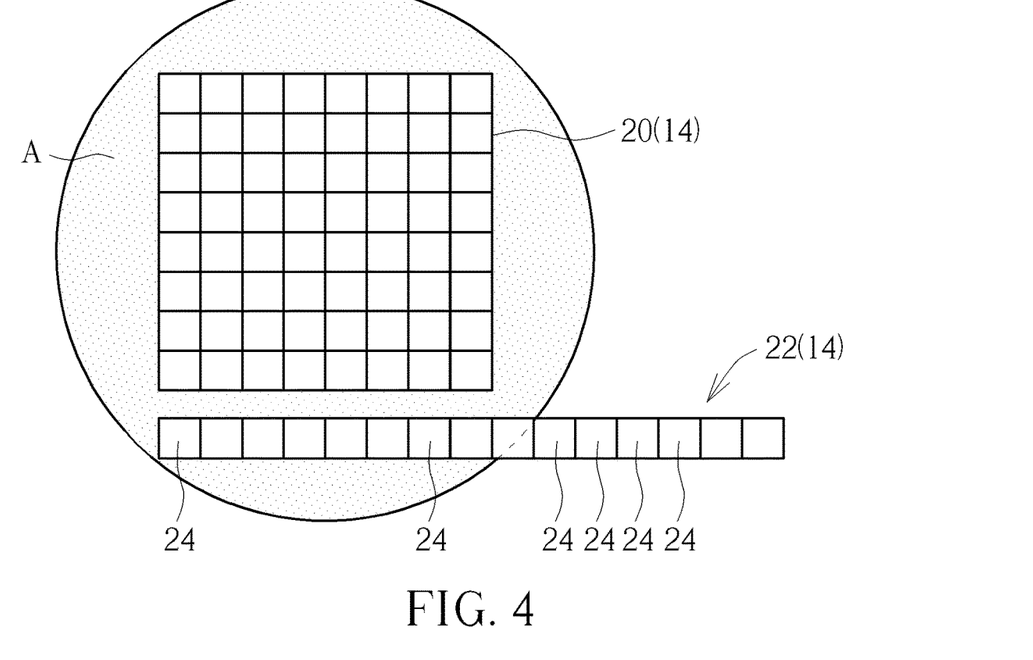
FIG. 4 is a top view of a relation between a sensor module and an illumination area shown in FIG. 2.
Figure 5:
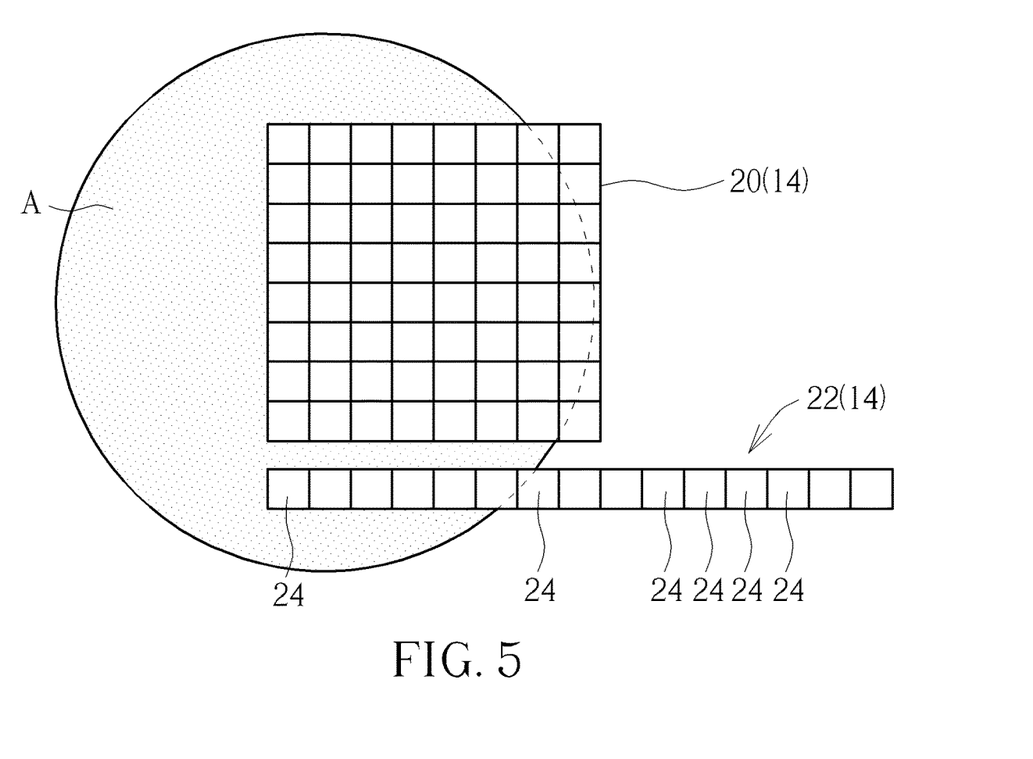
FIG. 5 is a top view of a relation between the sensor module and the illumination area shown in FIG. 3.
Figure 6:
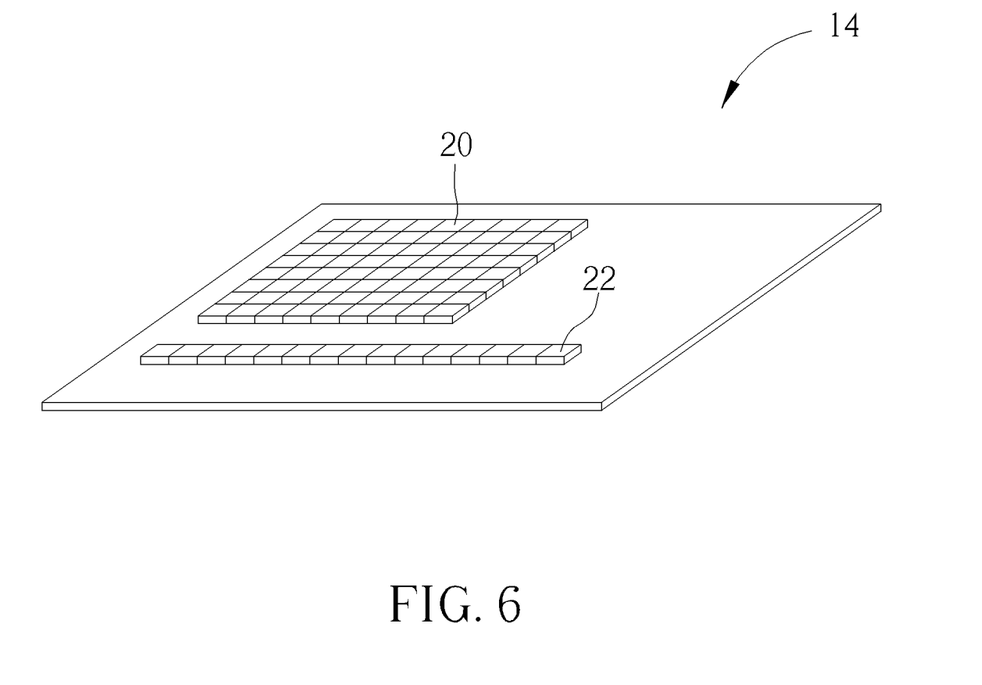
FIG. 6 to FIG. 10 are diagrams of the sensor module according to different embodiments of the present invention.
Figure 7:
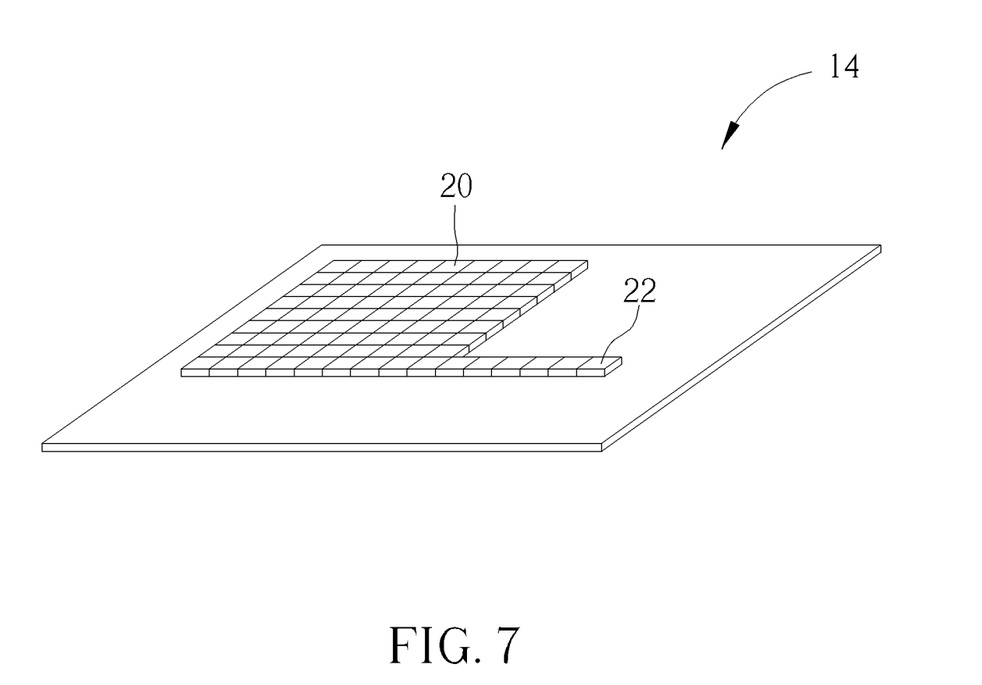

Please refer to FIG. 4 and FIG. 5. FIG. 4 is a top view of a relation between the sensor module 14 and the illumination area A as the optical navigation apparatus 12 shown in FIG. 2. FIG. 5 is a top view of a relation between the sensor module 14 and the illumination area A as the optical navigation apparatus 12 shown in FIG. 3. In the present invention, the sensor array 20 can be a rectangular form, and a sensing region of the sensor array 20 can be preferably located within the illumination area A when the optical navigation apparatus 12 is located on the working surface S. The detector strip 22 can include a plurality of detectors 24 arranges as at least one strip, and a detection region of the detector strip 22 can protrude from a scope of the illumination area A; that is to say, the detection region can be across the illumination area A because the detector strip 22 intersects an edge of the illumination area A.

An amount of the strip can be singular or plural. The detector strip 22 which has any amount of the strips and any length of each strip conforms to a design demand of the present invention if two parts of the plurality of detectors 24 respectively faces the illumination area A and outside of the illumination area A. When the optical navigation apparatus 12 is on the working surface S, a center of the sensor array 20 may align with a center of the illumination area A, and a left part of the detector strip 22 faces the illumination area A but a right part of the detector strip 22 faces the working surface S without the illumination area A, as shown in FIG. 4. When optical navigation apparatus 12 is lifted, the left part of the detector strip 22 (less than the left part illustrated in FIG. 4) still faces the illumination area A, and the right part of the detector strip 22 (more than the right part illustrated in FIG. 4) faces the working surface S without the illumination area A, as shown in FIG. 5.

A length of the detector strip 22 has to be greater than a length of the sensor array 20 or a dimension of the illumination area A, so the amount of the detectors 24 that has the detection region over the illumination area A can be decreased when the optical navigation apparatus 12 is lifted, and further can be increased when the optical navigation apparatus 12 is lowered. If the detector 24 is switched from a condition facing the illumination area A and a condition away from the illumination area A, the detection result of the detector 24 can be changed, and the processor 18 can analyze parameter variation of the detection result from one detector 24 or several detectors 24 to determine the vertical movement of the detector strip 22, and then acquire the lift height of the optical navigation apparatus 12 accordingly. In the present invention, a parameter of the detection result can be, but not limited to, intensity, a voltage or a current generated by the detector strip 22.

Please refer to FIG. 6 to FIG. 10. FIG. 6 to FIG. 10 are diagrams of the sensor module 14 according to different embodiments of the present invention. In the embodiment shown in FIG. 6, the sensor array 20 and the detector strip 22 are separated units. The detector strip 22 can be spaced from the sensor array 20, so that the processor 18 can distinguish the detection result from the sensing result, and then analyze the detection result to determine the lift height of the optical navigation apparatus 12. In the embodiment shown in FIG. 7, the detector strip 22 can be connected to a side of the sensor array 20 for combination; therefore, the processor 18 can identify some units of the sensor module 14 as the detectors of the detector strip 22, and analyze the detection result of the identified units to determine the lift height of the optical navigation apparatus 12.

Figure 8:
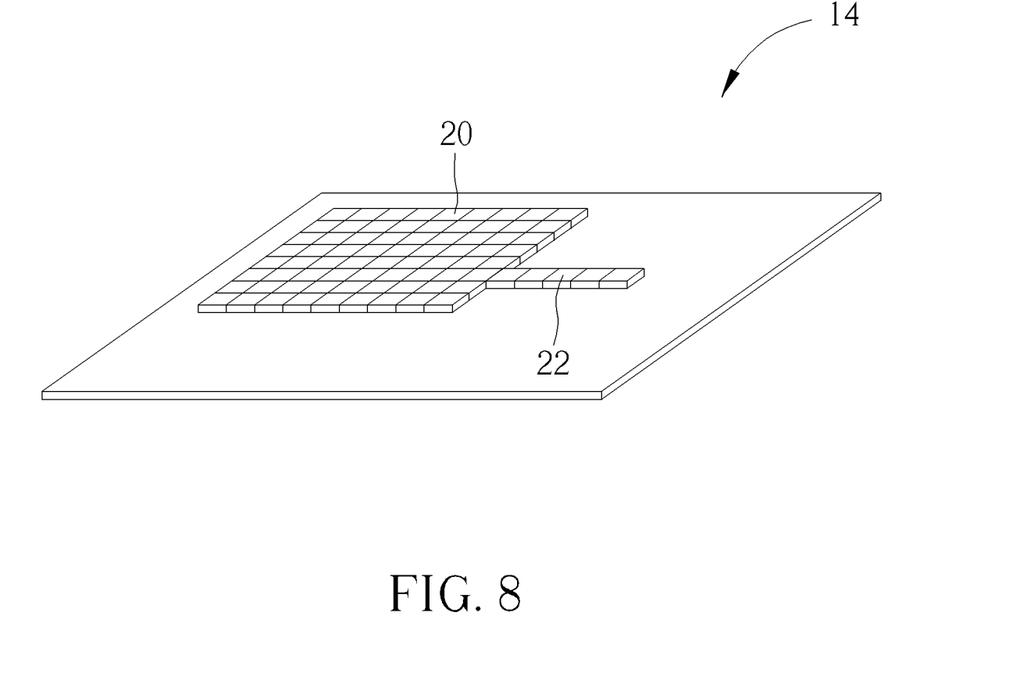
Figure 9:
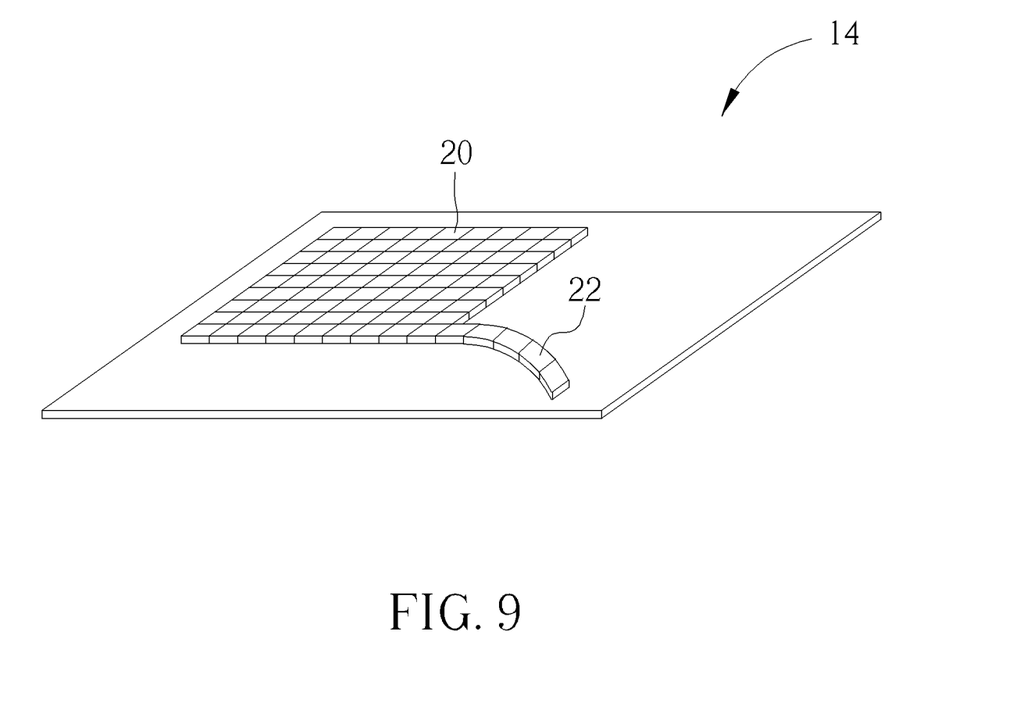
Figure 10:
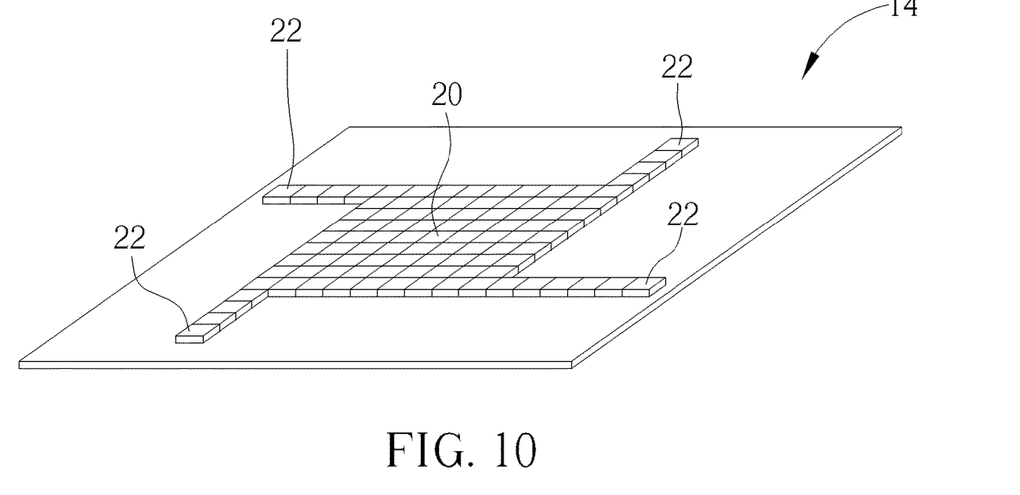

In the embodiment shown in FIG. 8, the detector strip 22 can be surrounded by the sensor array 20. The detector strip 22 can protrude from any side of the sensor array 20, so that the detector strip 22 can acquire the parameter variation earlier than the sensor array 20 when the optical navigation apparatus 12 is lifted or lowered. The above-mentioned embodiments provide the detector strip 22 being a straight form; however, in the embodiment shown in FIG. 9, the detector strip 22 can be designed as a curved form, and a curvature of the curved detector strip 22 can be designed according to an actual demand. In the embodiment shown in FIG. 10, the sensor module 14 may include one sensor array 20 and several detector strips 22. The plurality of detector strips 22 can be respectively disposed on different sides of the sensor array 20; when the optical navigation apparatus 12 is lifted in an inclined manner, the sensor module 14 can immediately acquire the parameter variation of the detection result because the detector strips 22 are set at all aspects of the sensor module 14.

Figure 11:
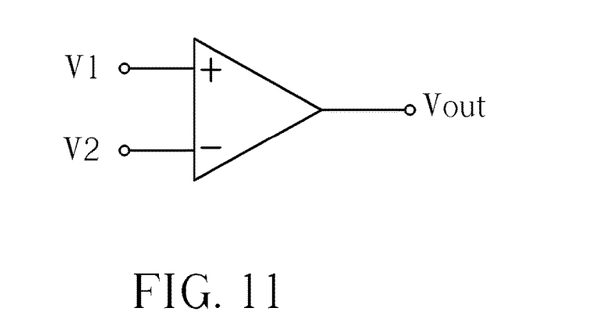
FIG. 11 is a circuit diagram of a comparison circuit inside the processor according to the embodiment of the present invention.
Figure 12:
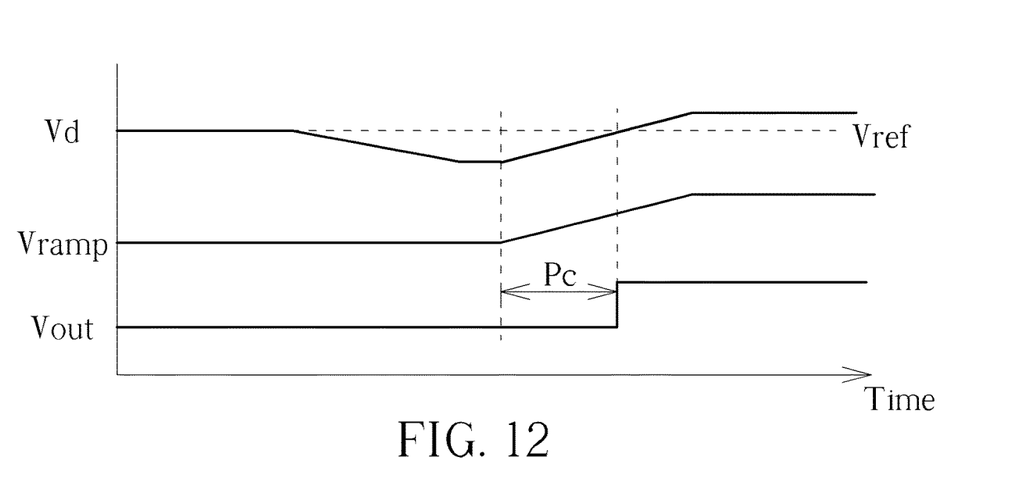
FIG. 12 is a waveform diagram of signals for the comparison circuit according to the embodiment of the present invention.
Figure 13:
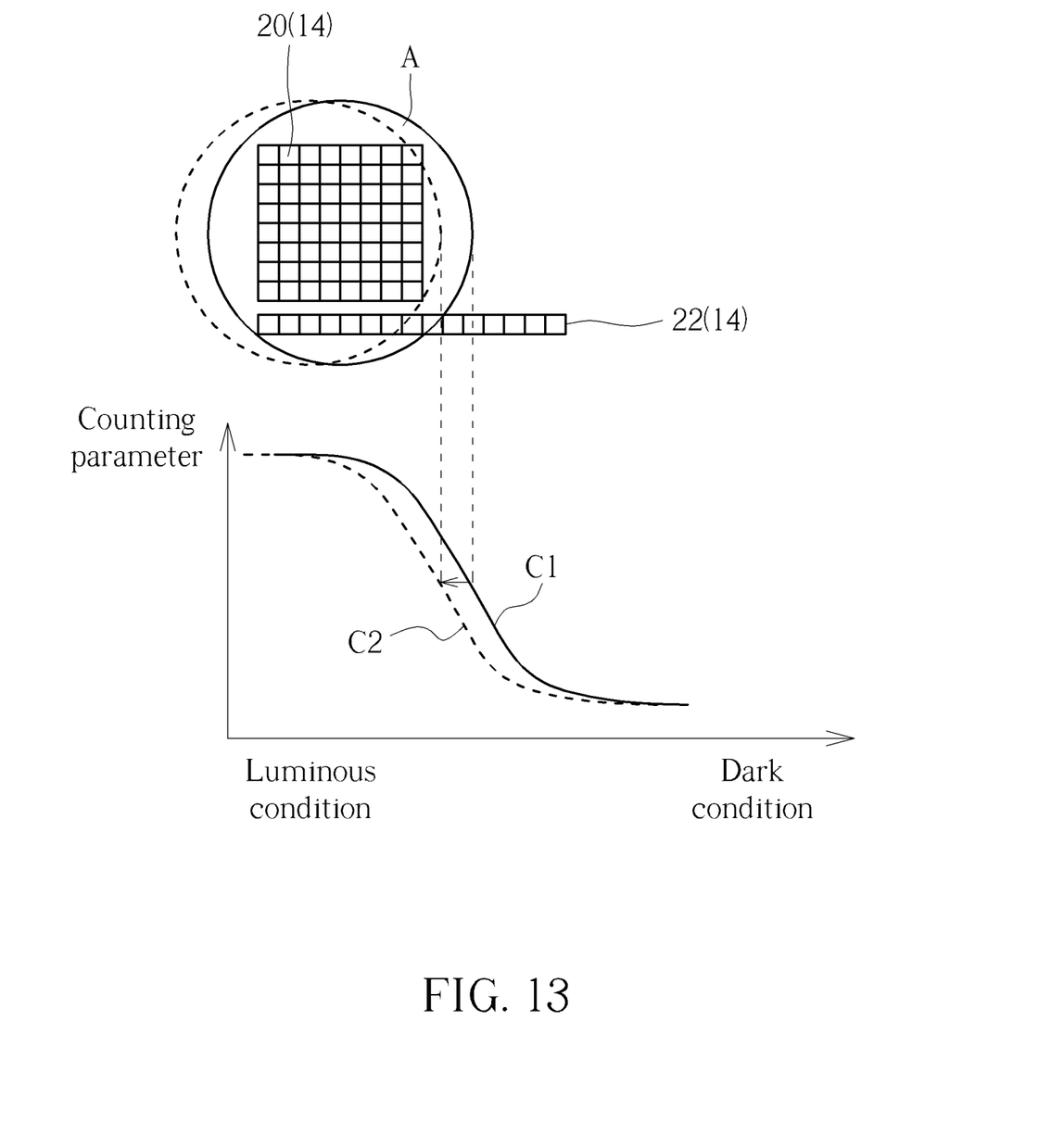
FIG. 13 is a diagram of distribution of counting parameters from the comparison circuit according to the embodiment of the present invention.

Please refer to FIG. 11 to FIG. 13. FIG. 11 is a circuit diagram of a comparison circuit 26 of the optical detecting device 10 according to the embodiment of the present invention. FIG. 12 is a waveform diagram of signals for the comparison circuit 26 according to the embodiment of the present invention. FIG. 13 is a diagram of distribution of counting parameters Pc from the comparison circuit 26 according to the embodiment of the present invention. The optical detecting device 10 may include a plurality of comparison circuits 26 respectively electrically connected to the corresponding detectors 24 of the detector strip 22, so that an amount of the comparison circuit 26 may be equal to an amount of the detector 24. The comparison circuit 26 can compare a first input signal V1 (such as the detection result Vd of the detector 24 plus a ramp signal Vramp) with a second input signal V2 (such as a reference signal Vref). An output signal Vout of the comparison circuit 26 can be changed when the first input signal V1 is greater than the second input signal V2, and the counting parameter Pc of each comparison circuit 26 may be different from the counting parameter Pc of other comparison circuit 26 due to illumination intensity detected by each detector 24.

A clock counting mechanism (which is not shown in the figures) may be actuated in the moment that the ramp signal Vramp starts, and stop counting when the first input signal V1 exceeds the second input signal V2. In the all detectors 24 of the detector strip 22, the detector 24 which aligns with a bright region within the illumination area A can have the high counting parameter Pc. The detector 24 which aligns with a dim region within the illumination area A or a dark region outside the illumination area A can have the low counting parameter Pc. The counting parameter Pc of each comparison circuit 26 can be analyzed to detect the edge of the illumination area A.

As shown in FIG. 13, when the optical navigation apparatus 12 is on the working surface S, the detector strip 22 may detect the solid-line illumination area A, and the distribution of the counting parameters Pc from the comparison circuits 26 of the detector strip 22 can be represented as a curve C1; when the optical navigation apparatus 12 is lifted, the detector strip 22 detects the dotted-line illumination area A, and the distribution of the counting parameters Pc from the comparison circuits 26 of the detector strip 22 can be represented as a curve C2. The counting parameters Pc of some detectors 24, which correspond to a range between the edge of the solid-line illumination area A and the edge of the dotted-line illumination area A, can be decreased in response to the lifting optical navigation apparatus 12, and therefore the distribution of the counting parameters Pc can be changed from the curve C1 to the curve C2. The processor 18 can monitor variation of the curves C1 and C2 for determining the edge of the illumination area A.

In conclusion, the detectors of the present invention preferably can be, but not limited to, a photodiode due to low noise. The signals generated by the detectors within the detector strip can be integrated, and the said signals can be the detection result as the intensity, the voltage or the current from the detector strip, so the optical detecting device can analyze the detection result for determining the lift height of the optical navigation apparatus. Further, energy of each detector may be individually analyzed to decide which detector detects illumination variation for determining position of the edge of the illumination area, and the lift height of the optical navigation apparatus can be computed accordingly. The optical detecting device can reduce a pitch between adjacent detectors of the detector strip for preferred precision. Comparing to the prior art, the detector strip longer than the illumination area projected by the light source can include the plurality of detectors with the small pitches; even if the optical navigation apparatus is slightly lifted, the detectors align with the edge of the illumination area still can accurately detect shifting of the edge, that is to say, the optical detecting device of the present invention can utilize the detector strip to immediately and precisely determine the small lift height of the optical navigation apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detecting device of detecting a lift height of an optical navigation apparatus, the optical detecting device comprising:

a sensor module comprising a sensor array and one detector strip, a length of the detector strip is greater than a length of the sensor array, the detector strip comprising a plurality of detectors, the sensor array being adapted to acquire navigation information of the optical navigation apparatus moved relative to a working surface by sensing an illumination area, and the detector strip having a detection region across an edge of the illumination area sensed by the sensor array; and a processor electrically connected to the sensor module, and adapted to integrate signals provided by a decreased amount or an increased amount of some of the plurality of detectors across the edge for computing the lift height of the optical navigation apparatus relative to the working surface according to a detection result of the detector strip;

wherein the detection result is a number of activated detectors or a number of inactivated detectors within the detector strip.

2. The optical detecting device of claim 1, wherein the optical detecting device further comprises a light source adapted to project the illumination area onto the working surface.

3. The optical detecting device of claim 1, wherein the plurality of detectors is arranged as a strip intersecting the edge of the illumination area.

4. The optical detecting device of claim 3, wherein one part of the plurality of detectors faces the illumination area and the other part of the plurality of detectors faces the working surface without the illumination area when a center of the sensor array aligns with a center of the illumination area.

5. The optical detecting device of claim 3, wherein an amount of the plurality of detectors having the detection region across the illumination area is decreased when the optical navigation apparatus is lifted.

6. The optical detecting device of claim 1, wherein the processor analyzes parameter variation of the detection result for determining the lift height.

7. The optical detecting device of claim 6, wherein a parameter of the detection result is intensity, a voltage or a current generated by the detector strip.

8. The optical detecting device of claim 1, wherein the optical detecting device further comprises at least one comparison circuit used to compare the detection result with a reference signal for determining the lift height.

9. The optical detecting device of claim 8, wherein an amount of the comparison circuit corresponds to an amount of detectors within the detector strip.

10. The optical detecting device of claim 1, wherein the detector strip is spaced from the sensor array, or is combined with the sensor array.

11. The optical detecting device of claim 1, wherein the detector strip is connected to a side of the sensor array, or surrounded by the sensor array.

12. The optical detecting device of claim 1, wherein the detector strip is a straight form or a curved form.

13. The optical detecting device of claim 1, wherein the sensor module comprises a plurality of detector strips respectively disposed on different sides of the sensor array.

* * * * *